April 16, 1968 F. E. SHASHOUA ETAL 3,378,646

CONTROL SYSTEM FOR HELICAL SCAN RECORDER

Filed March 8, 1963 2 Sheets-Sheet 1

INVENTORS:
FRED E. SHASHOUA &
FURMAN D. KELL
BY
Edward J. Norton
ATTORNEY

INVENTORS:
FRED E. SHASHOUA &
FURMAN D. KELL
BY
Edward J. Norton
ATTORNEY

United States Patent Office 3,378,646

Patented Apr. 16, 1968

3,378,646
CONTROL SYSTEM FOR HELICAL SCAN RECORDER

Fred E. Shashoua, Cherry Hill, and Furman D. Kell, Haddonfield, N.J., assignors to Radio Corporation of America, a corporation of Delaware Filed Mar. 8, 1963, Ser. No. 263,801
20 Claims. (Cl. 179—100.2)

This invention relates to improved systems for controlling the passage of a movable record medium over a predetermined path and, particularly, to improved control systems for maintaining a desired tension in the medium during its passage over the path while, at the same time, providing a method and apparatus facilitating the proper splicing of the record medium.

Various signal recording and reproducing systems are known in which a magnetic tape or other record medium is made to describe a helical path around the periphery of a structure usually of a cylindrical construction and including one or more signal recording-reproducing devices. Such systems are referred to as helical scan recording systems and, in certain applications, as slant track recording systems. The tape may completely encircle the structure so that a tape helix of 360° or more is developed. Alternatively, on open loop is also used with the tape describing a helical path around only a portion of the periphery of the structure. By way of example, tape helices of approximately 270°, 180°, or 90° can be formed in this manner.

The signal recording-reproducing devices, which may be magnetic heads, for example, are made to rotate at constant speed and in a fixed plane at right angles to the longitudinal axis of the structure around which the tape is driven. Because of the tape helix, a helix angle or angle-of-scan exists between the rotating signal recording-reproducing devices and the direction of tape travel. The angle is governed by the width of the tape and by the diameter of the structure supporting the tape helix. Each signal recording-reproducing device will scan diagonally across the width of the tape. By a proper choice of such factors as the number and spacing of the recording devices used, the tape helix angle, tape speed, and the rotating speed of the signal recording-reproducing devices, the signal recording-reproducing devices can be made to scan at a desired angle diagonally from one edge of the tape to the other or over only a given portion of the tape, for example, one-half the width of the tape. A signal fed to the recording-reproducing devices is recorded on, and can be produced from, a succession of parallel, equal-length tracks, each extending at the same angle across the tape width.

In signal recording systems of the type described above, a preferred tension exists in the record medium as it moves in a helical path past the signal recording-reproducing devices. This tension determines the effective diameter that the tape assumes on the helix. In order to properly reproduce a signal from the recorded tracks on the tape, it is necessary that the tension and therefore the effective tape diameter be the same upon reproduction of the signal as it was in recording the signal. If such a condition does not exist upon reproduction, the signal recording-reproducing devices are not properly maintained in alignment with the recorded tracks, preventing completely satisfactory reproduction of the recorded signal.

Various techniques have been proposed for maintaining the proper tension by providing, for example, precise, local control over the tape supply and take-up reel motors. While providing a degree of accuracy in applications where the same unit is used both for recording and reproduction, the use of such techniques results in additional complexity while also being expensive to implement. The techniques previously available have not proven completely satisfactory where a signal is recorded by one unit and reproduced by a second, different unit due to the difficulties involved in matching the operation of the one unit to that of the other. A control system of simple construction and operation is needed in systems of the type described for automatically and precisely maintaining the same tension and effective diameter of the tape during reproduction as existed during recording.

In the practical operation of a signal recording and reproducing system which records a signal on a succession of tracks extending across the tape, splicing is often necessary in editing and repairing the record medium. In performing the splicing operation, a uniform spacing between the recorded tracks on opposite sides of the splice is necessary. If the spacing is not uniform, a mistracking by the signal recording-reproducing devices will occur immediately following the splice and continue until the recording-reproducing devices can be again aligned with the tracks. It is desirable that a method and apparatus be provided for assuring the existence of a uniform track spacing between the signal tracks on the two segments of the spliced record medium.

It is an object of the invention to provide an improved arrangement for automatically controlling the movement of a web-like member.

Another object is to provide an improved control system in a helical-scan signal recording and reproducing system for automatically maintaining the tension in the record medium as it describes the helical path the same on reproduction as existed during the recording of the signal.

A further object is to provide an improved control system for maintaining a predetermined effective tape diameter in arrangements where a movable magnetic tape is made to describe a helical path with respect to a signal recording and reproducing device.

A further object is to provide an improved control system for use in a helical scan signal recording and reproducing system by which information is recorded on the record medium as to the tension in the record medium as it describes the helical path during signal recording, thereby making the information available to maintain the same tension during signal reproduction.

A still further object is to provide an improved control system for use in a signal recording and reproducing system to automatically match the movement of the record medium upon signal reproduction with that during signal recording while at the same time providing an improved method and apparatus facilitating the splicing of the record medium.

A still further object is to provide an improved control system for use in a helical scan signal recording and reproducing system by which information is recorded on the record medium that can be used to automatically maintain the same tension in the record medium during both signal recording and reproduction as the record medium describes the helical path and that can also be used to facilitate the proper splicing of the record medium.

A still further object is to provide for use with a signal recording and reproducing system of the type which records a signal on a succession of tracks extending diagonally across a record medium an improved method and apparatus by which information is recorded on the record medium that assures uniform track spacing in splicing the record medium.

In describing the invention, reference will be made to a magnetic tape, helical scan signal recording and reproducing system. The invention is not limited to use in such an application. It can be adapted for use in a wide range of applications using various types of record mediums and signal recording-reproducing devices. For example, instead of employing magnetic heads arranged to record and reproduce a signal from a magnetic tape, a suitable form of writing stylus may be used with an appropriate record medium. In a further example, the signal recording and reproducing system can employ a light recording and reproducing technique.

Briefly, in the embodiment of the invention described herein, there is provided a signal recording and reproducing system in which a magnetic tape is driven to, around and away from a structure of cylindrical construction. The magnetic tape describes a helical path about the periphery of the cylindrical structure. A magnetic head is physically positioned in contact with the tape adjacent to one edge thereof at a point just before the tape begins to describe the helical path around the cylindrical structure. A second magnetic head is physically positioned in contact with the tape adjacent to the other edge thereof at a point just after the tape has completed its passage through the helical path. A control signal including a train of pulses of constant frequency is fed simultaneously to the magnetic heads. The magnetic heads record the control signal on longitudinal tracks extending along the respective edges of the tape.

The magnetic heads are spaced from one another along the tape path so that the pulses recorded adjacent to one edge of the tape by one of the magnetic heads are aligned with the pulses recorded adjacent to the other edge of the tape by the other magnetic head. Two identical and aligned control tracks are recorded on the tape.

In reproducing a recorded information signal, magnetic heads reproduce the control signals recorded on the control tracks at the edges of the tape. The two reproduced control signals are fed to suitable means for comparing the phase of the two control signals. Should the tension on the tape as it describes the helical path past the first magnetic head differ from that which existed during recording, an error signal determined by the phase error between the control signals is produced. The error signal is fed to suitable means for continuously adjusting the tape tension by such means as the torque control for the tape supply reel motor. By using dual control tracks recorded in the manner described, a control system of simple construction and operation is provided for maintaining automatically and accurately the same tape tension during both recording and reproduction of the information signal, permitting the faithful reproduction of the information signal.

A feature of the invention is that the pulses recorded on the dual control tracks are aligned. There is a pulse recorded on one edge of the tape directly opposite each pulse recorded on the other edge of the tape. By utilizing the pulses recorded on the control tracks, it is possible to complete a splicing operation either by diagonally cutting the tape between the recorded tracks or cutting the tape at right angles to the tape edge so that uniform spacing between the recorded tracks is maintained.

In an alternative embodiment of the invention, the use of dual control tracks can be avoided by deriving directly from the diagonally recorded signal tracks upon reproduction a pair of pulse trains having a phase relationship determined by the tension in the tape as it describes the helical path. An error signal determined by the phase difference can be used to control the tape tension as in the case where dual control tracks are recorded on the tape.

The invention, thusly, provides an improved arrangement for maintaining control over the movement of a record medium in a signal recording and reproducing system while at the same time facilitating a splicing operation on the record medium.

A more complete description of the invention will now be given in connection with the accompanying drawings, in which.

Figures 1, 2, 5:
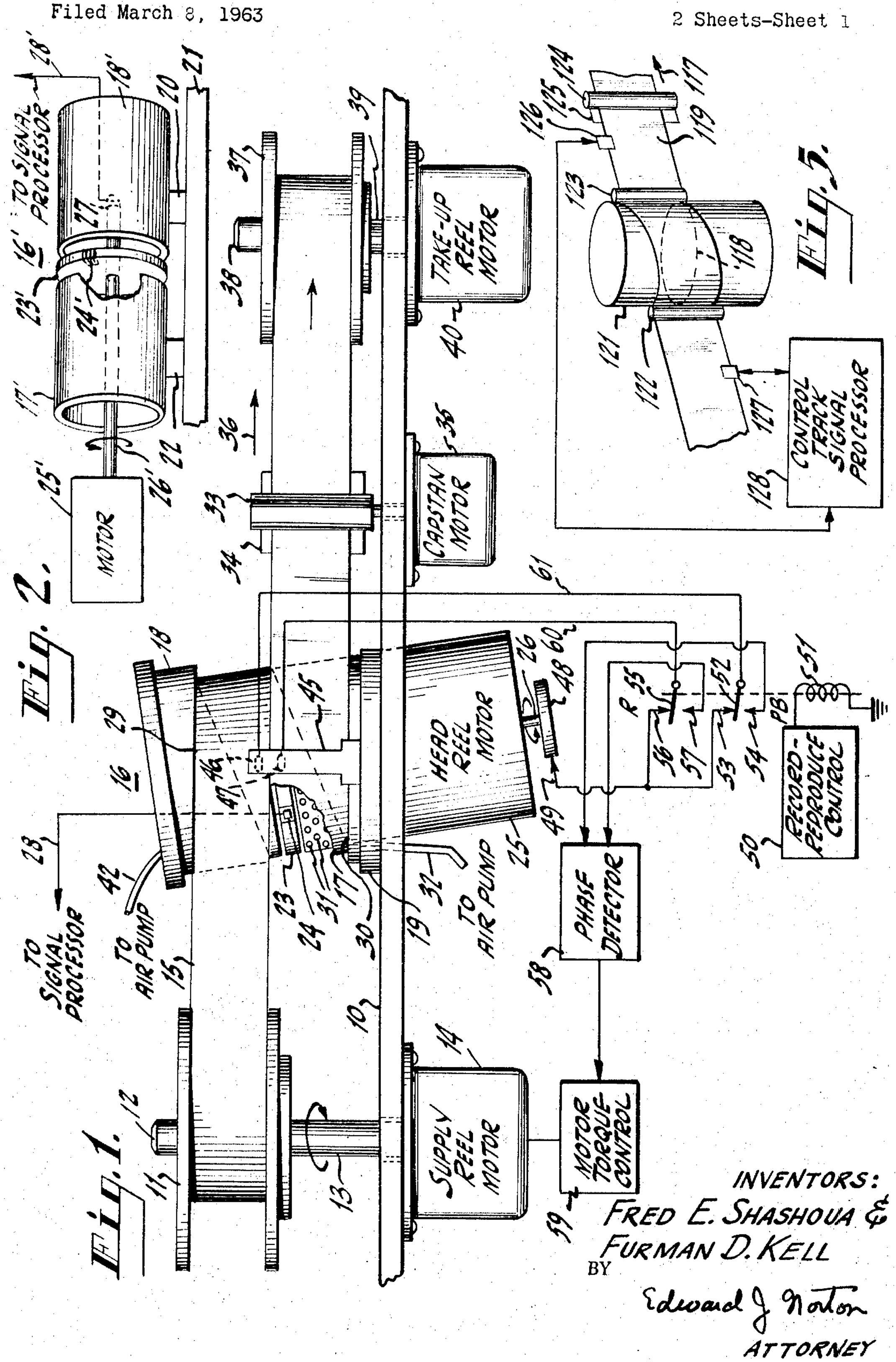
FIG. 1 is partly a plan view and partly a block diagram of a signal recording and reproducing system including one embodiment of a control system constructed according to the invention.
FIG. 2 is a simplified perspective view of the helical scan magnetic head assembly shown in FIG. 1.

FIG. 1 of the drawing shows by way of example a helical scan magnetic tape recording and reproducing system in which a full tape helix of greater than 360° is formed. In the interest of providing a clear understanding of the invention and to avoid unnecessary confusion in the drawing, that part of the recording and reproducing system not directly involved with the control system of the invention has been omitted in FIG. 1. A more detailed description of the structure typically involved in the operation of the recording and reproducing system shown in FIG. 1 is given in FIGS. 2 and 4. As the description proceeds, various dimensions, frequencies, speeds and values will be given. This information is presented to assist in an understanding of the invention. The invention is in no way limited to use in a system using the particular circuit and equipment parameters given, since these parameters are and can be determined according to the needs of a particular application. It will be assumed that the signal recording and reproducing system to be described is built to use frequency modulation (FM) recording with a 4 megacycle (mc.) bandwidth capability.

A metallic panel or similar supporting structure 10 is shown in FIG. 1. A magnetic tape supply reel 11 is secured by a suitable locking member 12 to a driving shaft 13 which extends through the panel 10 to a supply reel motor 14. The motor 14, which can be mounted along with the driving shaft 13 on the panel 10 by any suitable mechanical means, applies torque to the supply reel 11 via the shaft 13 in the direction opposite to that shown by the arrow. The supply reel 11 is forced to rotate in the direction of the arrow through the action of the capstan assembly 33, 34, 35 described below. A length of double-face coated magnetic tape 15 is wound on the supply reel. The tape 15 is, for example, two inches wide, and comprises a Mylar or other plastic backing coated on both sides by magnetic oxide particles.

The tape 15 is pulled from the supply reel 11 to, completely around, and away from a helically machined mandrel indicated generally as 16. A simplified view indicating the details of the mandrel's construction is given in FIG. 2. Elements in FIG. 2 are given the same reference numbers as the corresponding elements in FIG. 1 with the elements in FIG. 2 being primed. The mandrel 16, 16′ includes a first stationary, hollow, cylindrical member 17, 17′. As shown in FIG. 1, the member 17 is secured to the panel 10 by a mounting plate 19. The mandrel 16, 16′ also includes a second stationary, hollow, cylindrical member 18, 18′. The member 18, 18′ is secured to the panel 10 and to the first member 17, 17′ by a supporting brace structure 20, 21 and 22 shown in FIG. 2 but not visible in the view of FIG. 1. Such structure would be included in FIG. 1 on the side of the mandrel 16 opposite to that shown as exposed to the viewer.

The two members 17, 17′ and 18, 18′ are spaced apart so that a uniform gap or spacing exists therebetween. A rotatable disc or wheel 23, 23′ having a peripheral surface even with that of the cylindrical members 17 and 18 is positioned in the gap between the two members 17, 17' and 18, 18'. A single magnetic head 24, 24' is mounted on the periphery of the wheel 23, 23'. Signal current is conducted to or from the magnetic head 23, 23' by means of a suitable device represented in FIG. 2 by slip-rings 27 located at the axis of the wheel 23, 23' and lead wire 28, 28'. The head wheel 23, 23' is of a diameter to cause the magnetic head 24, 24' to extend above the surface of the cylindrical members 17, 17' and 18, 18' sufficiently to firmly contact the tape 15. By way of example, the head wheel diameter may be 8.23 inches. In the example given, the angle between the plane through which the head wheel 23 rotates and the edge of tape 15, defined as the helix angle, is 4 degrees and 26 minutes. The tape 15 wraps around the helical mandrel 16 for 370° and presents a 55 mil tape surface, in cylindrical form, to the magnetic head 23.

A head wheel motor 25, 25' serves to rotate the head wheel 23, 23' via a shaft 26, 26' in the direction of the arrow. While the head wheel 23, 23' is shown as being driven in a direction opposite to the direction of tape travel, the head wheel 23, 23' may be driven in certain applications in the direction of the tape travel. Since the rotation direction of the head wheel 23, 23' determines the direction in which the record tracks are diagonally placed on the tape 15, from right-to-left or from left-to-right with respect to the direction of the tape travel, it is necessary that the head wheel 23, 23' be rotated in the same given direction during signal recording and reproduction. The head wheel motor 25, 25' drives the head wheel 23, 23' at, for example, 60 revolutions per second.

As shown in FIG. 1, cylindrical member 18 includes a recessed edge portion 29 for guiding the tape onto and around the mandrel 16. The second cylindrical member 17 includes a recessed edge portion 30 for guiding the tape 15 away from the mandrel 16. A section of the tape 15 on the cylindrical member 17 is cut away to show the head wheel 23 and a plurality of holes 31 in the surface of member 17. A plurality of holes, not shown, are similarly arranged in the surface of the cylindrical member 18. Hydrostatic air lubrication of the tape 15 on the helix mandrel 16 is provided by pressurized air fed through the holes 31 via suitable tubes 32 and 42 connected to an air pump, not shown. The holes 31 can be 0.040 inch in diameter, for example. In addition to providing a control over tape diameter, this lubrication reduces drag friction between the tape 15 and the mandrel 16. Tape wear is reduced, since the rotating head 24 is the only element that contacts the surface of the tape 15. The hydrostatic air lubrication of the tape 15 in the areas on the two members 17 and 18 is supplemented by hydrodynamic lubrication on the circumference of the head wheel 23 provided by the flat cylindrical surface of the wheel 23.

The tape 15 upon leaving the mandrel 16 passes between a capstan 33 and pressure roller 34. A capstan motor 35 drives the capstan 33 which in turn drives the tape 15 in the direction of the arrow 36. By way of example, the capstan motor 35 is continually run at 600 revolutions per minute, resulting in a tape speed of 12 inches per second and a head-to-tape speed of approximately 1500 inches per second. A take up reel 37 locked by member 38 to a shaft 39 driven by a motor 40 in the direction of the arrow receives the tape 15. The take up reel motor 40 and the capstan motor 35, as well as the head wheel motor 25 and supply reel motor 14, are mechanically mounted on and supported by the panel 10 or other structure using known techniques.

The discussion has been directed so far to a broad outline of a helical scan signal recording and reproducing system. The parts of the system shown in FIG. 1 are not drawn to scale but rather are arranged only to indicate the relation of the parts to one another along the tape path. An arm-like member 45 is mounted on the plate 19 so that it extends over the tape 15 in parallel with the cylindrical surface of the tape helix. The arm 45 is positioned in the area where the tape 15 is both entering the mandrel 16 and leaving the mandrel 16. A first control track magnetic head 46 is positioned at the end of the arm 45 so that it contacts the lower edge of the tape 15 as the tape 15 begins to describe the helical path around the mandrel 16. A second control track magnetic head 47 is positioned on the arm 45 so that the head 47 contacts the upper edge of the tape 15 as the tape 15 completes the helical path and leaves the mandrel 16.

A tone wheel 48 is mounted on and driven by the shaft 26 of the head wheel motor 25. The tone wheel 48 can be constructed in any known manner and can include, for example, a single insert of magnetic susceptible material on its peripheral surface. A magnetic induction pick-up means 49 functions to generate a pulse for each revolution of the tone wheel 48. Assuming that the motor 25 is operating at 60 revolutions per second, pick-up means 49 will generate a pulse train of 60 pulses per second.

A record-reproduce control 50 is shown for operating a relay 51. Relay 51 includes a first armature 52 arranged to be selectively driven between contacts 53, 54 and a second armature 55 arranged to be selectively driven between contacts 56, 57. Pick-up means 49 is connected to contact 56 and contact 53 of relay 51. Armature 55 is connected to the first control track magnetic head 47 over lead 60, and the other armature 52 of relay 51 is connected to the second control track magnetic head 46 over lead 61. Contacts 57 and 54 of relay 51 are both connected to a phase detector 58. The output of the phase detector 58 is connected to a motor torque control 59 for controlling the supply reel motor 14.

In the recording mode, power is first applied to the supply reel motor 14, head wheel motor 25, capstan motor 35 and take-up reel motor 40. Pressurized air is fed to the holes 31 via the tubes 32 and 42. Tape 15 is driven in the direction of the arrow 36. Signal information is fed to the magnetic head 24 on the head wheel 23. Magnetic head 24 scans diagonally across the width of tape 15 once per complete revolution of the head wheel 23. The information signal is recorded on a succession of parallel tracks extending from one edge of the tape to the other from right-to-left in the direction of tape travel. Because the magnetic head 24 upon completing one scan crosses over the abutting edges of the tape 15 and immediately begins the next scan across the tape 15, the system shown in FIG. 1 is referred to as a continuous recording system. The magnetic head 24 is, in effect, in continuous contact with the tape 15, resulting in a continuous recording of the information signal on the tape 15. Because of the tape speed given as 12 inches per second by way of example, the angle of the recorded tracks with respect to the tape edge will be approximately 4 degrees 24 minutes rather than the helix angle of 4 degrees 26 minutes referred to above.

Relay 51 is operated by the control 50 in the condition indicated in FIG. 1. The pulse train generated by the pick-up means 49 is fed to the control track magnetic head 47 over an electrical path including contact 56 and armature 55 of the relay 51 and lead 60. The pulse train is also fed to control track magnetic head 46 over a second electrical path including contact 53 and armature 52 of the relay 51 and lead 61. The magnetic heads 46, 47 act to simultaneously record the pulse train on longitudinal tracks extending along the respective edges of tape 15. The spacing between the magnetic heads 46 and 47 is determined by properly mounting the heads 46 and 47 on the arm 45 so that, when the tape 15 leaves the mandrel 16, a pulse has been recorded on the upper edge of the tape 15 by magnetic head 47 directly opposite each pulse recorded on the lower edge by magnetic head 46. Since the air lubrication determines the precise tape diameter, it is possible to effect some adjustment of the tape diameter with respect to the position of the magnetic heads 46 and 47 by controlling the air pressure supplied via the tubes 32, 42 and holes 31 so that the control pulses recorded on opposite edges of tape 15 are aligned.

Figure 3:
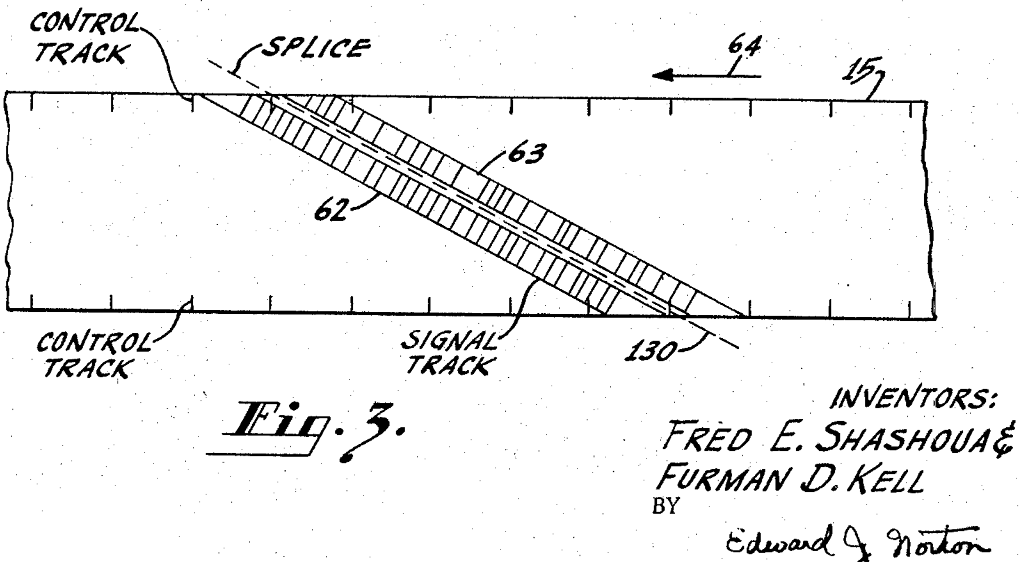
FIG. 3 is a view of a short section of the magnetic tape as used in the arrangement of FIG. 1 with a representation of the record tracks impressed thereon.

A section of the magnetic tape 15 upon which the signal and control information has been recorded in the above manner is shown in FIG. 3. First and second information signal tracks 62, 63 are shown. Taken with reference to the arrow 64 indicating the direction of tape travel, the tracks 62, 63 extend diagonally from the top of tape 15 to the bottom of the tape. Based on the circuit and equipment parameters given above by way of example, the signal tracks 62, 63 are 10 mil wide with a spacing of 5.4 mil. The angle of the tracks 62, 63 to the tape edge is 4 degrees 24 minutes. Should the signal information recorded on the tracks be a television signal based on United States standards, each of the tracks 62, 63 will have recorded thereon approximately one video field plus vertical blanking. The control pulses recorded by magnetic head 47 are shown exaggerated as to size along the top of the tape 15, while the control pulses recorded by magnetic head 46 also exaggerated as to size are spaced along the lower edge. The control pulses recorded on the respective control tracks are aligned.

In reproducing the recorded information signal on tracks 62, 63 shown in FIG. 3, the tape 15 is driven past the rotating head wheel 23 in much the same manner as during recording. Magnetic head 24 scans the record tracks, reproducing the recorded signal for application to a utilization circuit via leads 28. The tension in the tape 15 as it passes the magnetic head 24 can be determined within limits by the operation of the supply reel motor 14, the take-up reel motor 40 and the air lubrication provided via tubes 32, 42 and holes 31. However, if the tension in the tape 15 is not substantially the same while the recorded signal is being reproduced as it was during recording, resulting in a different effective tape diameter, a time discontinuity is introduced each time the magnetic head 23 crosses the abutting edges of the tape 15. The magnetic head 24 will begin the scan of the next track either to one side or the other of the track center according to whether the tape diameter is too small or too large. The magnetic head 24 does not properly scan the recorded tracks, and does not provide the desired faithful reproduction of the recorded signal.

The record-reproduce control 50 is operated to energize the winding of relay 51. Armature 55 engages contact 57, while the second armature 52 of relay 51 engages contact 54. Magnetic head 46 is now connected via lead 61 and the contact 54 and armature 52 of relay 51 to the phase detector 58. Magnetic head 47 is connected to the phase detector 58 via lead 60 and the contact 57 and armature 55 of relay 51. The control track magnetic heads 46, 47 act to reproduce the pulses recorded on the dual control tracks of tape 15. Due to the difference between the frequency bands of the recorded signals on the control tracks and on the information signal tracks, and also due to the difference between the head gap directions of the magnetic heads 46, 47 as compared to magnetic head 24, it has been found that the information signal tracks create little, if any interference in the control pulse trains. Since the control pulses recorded on the tape 15 are aligned according to the tension existing in the tape 15 at the time they were recorded, any difference in that tension during reproduction of the recorded signals results in pulses on one track being reproduced at a different time than those on the other track. If the tension is too small resulting in a larger tape diameter, the pulses reproduced from one track will lag in time the pulses reproduced from the other track. If the tension is too great resulting in a smaller tape diameter, the pulses reproduced from the one track will lead in time the pulses reproduced from the other track. A phase error exists between the two reproduced control pulse trains corresponding to the difference in the desired and existing tape tensions.

Phase detector 58, which may be of the type including a diode-bridge comparator, for example, is responsive to the two reproduced control pulse trains to generate an error signal determined by the phase difference therebetween. The phase detector 58 may be one which generates a direct current signal having its amplitude and phase determined by the phase error or, in the alternative, may be of the type which generates an alternating current signal having its frequency controlled by the error. The error signal produced by the detector 58 is fed to the motor torque control 59 which varies the torque of the supply reel motor 14 and thereby the tension on the tape 15. The motor torque control 59 acts to program the operation of the supply reel 11 so that the tension in tape 15 is always within predetermined limits. By operating the motor control 59 in response to the error signal, the tension in the tape 15 is accurately matched within the predetermined limits to the information included in the dual control tracks on the tape 15.

By using a dual control track in the manner described, it is possible to accurately and continuously maintain the tension on the tape 15 as it travels through the helical path past the magnetic head 24 substantially identical on both signal recording and reproduction. The control system provided adds little complexity to the overall system and does not require any major changes in the overall operation. It is possible to satisfactorily play back a tape on one system which has been originally recorded on another similar system, since distortion introduced due to differences in the operating parameters of the two systems, is reduced or substantially eliminated.

The overall performance of the signal recording and reproducing system is enhanced.

Figure 4:
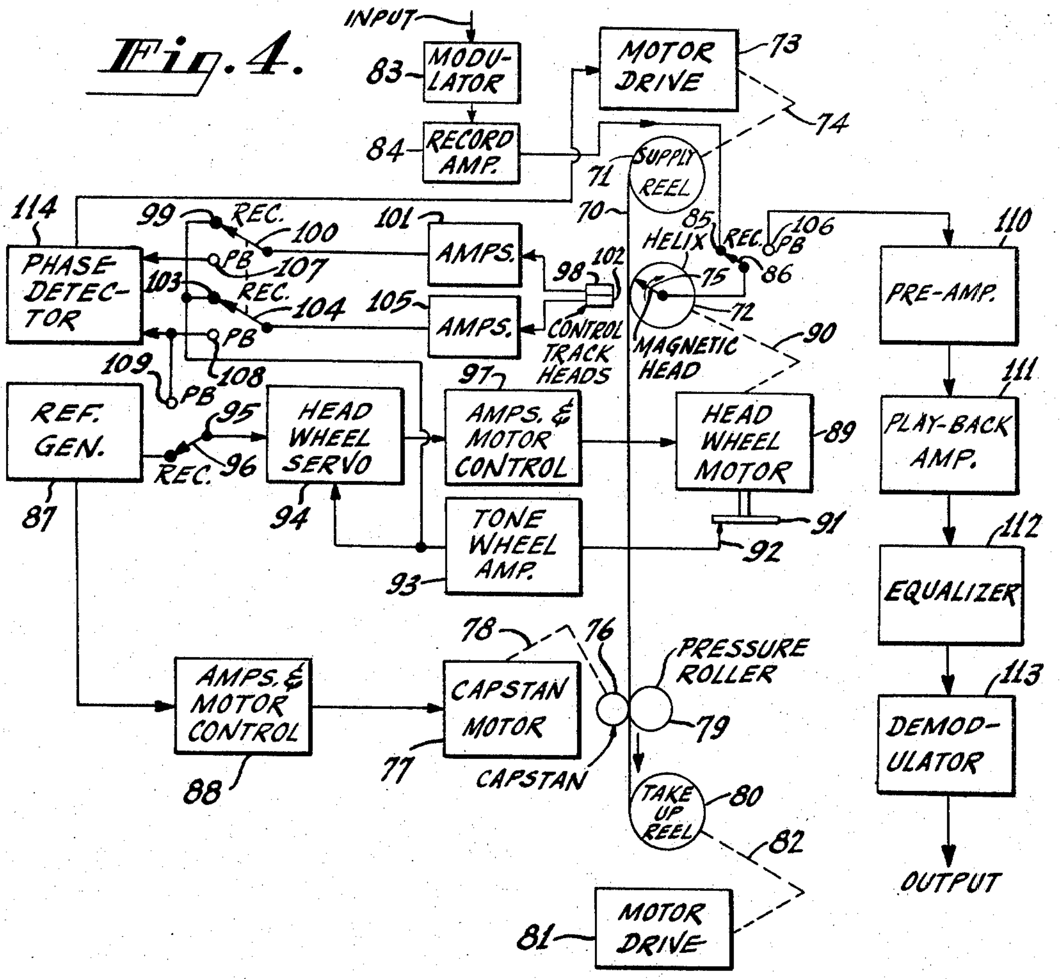
FIG. 4 is a block diagram showing in greater detail the arrangement of a signal recording and reproducing system including the structure of FIG. 1; and, FIG. 5 is partly a simplified perspective view and partly a block diagram showing further embodiment of the invention.

A detailed block diagram of a helical scan signal recording and reproducing system including structure similar to that shown in FIG. 1 is given in FIG. 4. FIG. 4 illustrates some refinements of the helical scan system desirable for its operation which are omitted in FIG. 1. A magnetic tape 70 travels from a supply reel 71 to, around and away from a helical mandrel 72, which may be identical to the mandrel 16 shown in FIG. 1 and further described in FIG. 2. Supply reel 71 is driven by a motor 73 via a mechanical linkage 74. A magnetic head 75 rotates in a plane inclined at an angle with respect to the direction of tape travel and in continuous contact with the inside of the tape cylinder formed around mandrel 72 in the manner of the magnetic head 24 shown in FIG. 1. The magnetic head 75 is driven by a head wheel motor 89 via the mechanical linkage 90. After leaving the mandrel 72, the tape 70 passes between the pressure roller 79 and the capstan 76 driven by the capstan motor 77 via mechanical linkage 78. The capstan motor 77 is driven at a substantially constant speed in response to the output of the reference generator 87 by the amplifier and motor control 88. A take-up reel 80 driven by motor 81 via mechanical linkage 82 receives the tape 70. While not shown, the usual tape guides, tape supply sensing means and other tape devices can be arranged along the tape path in a known manner.

In the recording mode, the various switches shown in FIG. 4 are in the position indicated as R. A signal to be recorded is fed to a frequency modulator 83. The modulated signal is amplified by the record amplifier 84 and fed to the magnetic head 75 over an electrical path including contact 85 and wiper arm 86. Magnetic head 75 records the signal on successive diagonal tracks in the manner shown in FIG. 3.

The tone wheel 91 and pick-up means 92 serve to generate a pulse train having a frequency determined by the rotational speed of the motor 89 and the magnetic head 75. A single pulse is typically produced each time the head 75 passes a given point in its revolution. The time of the pulse is therefore a function of both the phase and frequency of the rotation of the magnetic head 75. The pulse train generated by the tone wheel 91 and pick-up means 92 is fed through the tone wheel amplifier 93 to the head wheel servo 94. A signal of reference frequency supplied by the reference generator 87 is also fed to the head wheel servo 94 through contact 95 and wiper arm 96. The servo 94 acts to compare the tone wheel signal frequency and phase with that of the reference signal and applies the resulting error signal to the amplifier and motor control 97. The motor control 97 is responsive to the error signal to maintain the head wheel motor 89 at the proper constant operating speed.

In addition to being fed to the head wheel servo 94, the tone wheel signal is fed to a first control track head 98 over the electrical path including contact 99, wiper arm 100 and amplifiers 101. The tone wheel signal is simultaneously fed to a second control track head 102 over a further electrical path including contact 103, wiper arm 104 and amplifiers 105. Control track heads 98 and 102 function to record a pair of control tracks on tape 70 as shown in FIG. 3 and described above. One control track head 98 is positioned at one edge of the tape 70 near the beginning of the tape helix, while the other control track head 102 is positioned at the other edge of the tape 70 near the end of the tape helix. The control track heads 98 and 102 are spaced from one another in relation to the tension present in the tape so that the pulses recorded on the tape are aligned. Each pulse recorded by the control track head 98 appears on the tape 70 directly across from a pulse recorded by the second control track head 102.

In reproducing the signal recorded on the tape 70, the tape 70 passes over the tape path described. The switches are all switched to the contacts PB. Wiper arm 86 engages contact 106, wiper arm 100 engages contact 107, wiper arm 104 engages contact 108 and wiper arm 96 engages contact 109. The wiper arms 86, 96, 100 and 104 can be ganged together for simultaneous operation. Magnetic head 75 scans the record tracks on tape 70 to reproduce the signal recorded thereon. The reproduced signal is fed to a utilization circuit over an electrical path including wiper arm 86, contact 106, a preamplifier 110, playback amplifier 111, equalizer 112 and frequency demodulator 113. The control track heads 98, 102 reproduce the pulses recorded on the dual control tracks. An electrical path is completed from the control track head 98 to the phase detector 114 over an electrical path including amplifier 101, wiper arm 100 and contact 107. A further electrical path is completed from the control track head 102 to the phase detector 114 including amplifier 105, wiper arm 104, and contact 108. The phase detector 114 compares the phase of the two control track signals and produces an error signal determined by any phase difference therebetween. The error signal is fed to the motor drive 73 for controlling the operation of the supply reel 71. In this manner, the tension of the tape 70 and its effective diameter in moving over the mandrel 72 is maintained the same as that which existed during recording.

Since the pulses recorded on the control tracks are derived from the tone wheel 91 during recording, the control track pulses include information as to the velocity or frequency and phase of the head wheel motor 89 and therefore, the head wheel during recording. The control track pulses reproduced by one of the control track heads shown in FIG. 4 as the control track head 102 are fed to the head wheel servo 94 over an electrical path including contact 109 and wiper arm 96. The head wheel servo 94 compares the control track pulses with the tone wheel pulses generated by the tone wheel 91 and pick-up means 92. The resulting error signal is fed to the motor control 97 for controlling the operation of the head wheel motor 89. The head wheel motor 89 is made to operate at the same velocity and phase during reproduction as during recording. Magnetic head 75 is driven at the proper frequency and phase to scan the record tracks. The control system of the invention maintains the proper tension in the tape 70 to cause the magnetic head 75 to remain properly lined up with the record tracks as it completed successive scans across the tape 70.

Reference has been made to the control of the tape supply reel motor for varying the tension in the tape. Since the pressurized air lubrication supplied via holes 31 in the cylindrical members 17 and 18 of the mandrel 16 determines the precise tape diameter, the error signal produced by the phase detector 58 of FIG. 1 and 114 of FIG. 4 can be used to regulate the amount of pressurized air. The control of the pressurized air can be used instead of or in addition to the control exercised over the supply reel motor according to the needs of a particular application.

In placing the dual control tracks on the tape during recording, it is only necessary that a pulse source of substantially constant frequency be provided. As shown in FIG. 4, the operation of the signal recording and reproducing system normally involves the production of the tone wheel pulse train for use with the head wheel servo. Since this pulse train regulated by the servo loop is already available, it is convenient to use it as the pulse source for the two control track heads. This construction is shown in the drawing. However, it is not required that the tone wheel pulse train be used. Any pulse source such as, for example, the reference generator 87 shown in FIG. 4 may be used to supply the pulses to the control track heads during recording.

Various applications exist where it is desirable to record a further longitudinal track on the tape such as in the recording of a television signal where a sound track is needed. An additional magnetic head can be readily positioned in the tape path for this purpose to record a further longitudinal track in parallel with the control tracks.

Reference has been made in describing the arrangement of FIGURE 1 and FIGURE 4 to an embodiment in which a full tape loop arrangement is used. The invention is not limited to such an application. Helical scan systems are known in which, instead of a head wheel arranged to rotate between two stationary cylinders, the mandrel is formed as a single cylindrical body.

The magnetic head is mounted flush with the surface of the mandrel and the entire mandrel is made to rotate. The tape describes a helical path around the mandrel and is spaced from the surface of the mandrel by the resulting hydrodynamic air lubrication. The invention can be readily adapted to such a system by positioning the pair of control track heads before the tape begins to describe the helical path and after the tape has completed the helical path. The operation of the dual control track control system in maintaining the same effective tape diameter during recording and reproduction will be described above.

Open loop systems are also known. A simplified view of one embodiment of the invention in which the open loop approach is used is given in FIGURE 5. A magnetic tape 119 is driven in the direction of the arrow 117 by the combination of a capstan 124 and pressure roller 125 to, around and away from a mandrel 121. The mandrel 121 may be identical to the mandrel 16 shown in FIGURE 1. A pair of guide rollers 122, 123 guide the tape 119 in a helical path around the mandrel 121 for approximately 180°. A magnetic head wheel 118, indicated by dotted line, scans the tape in the manner described to record tracks across the width of the tape. The head wheel 118 may include two or more magnetic heads arranged about the periphery thereof, which scan successive tracks on the tape 119. A first control track head 127 is positioned before the tape 119 begins to describe the helical path around the mandrel 121, and a second control track head 126 is positioned at the opposite edge of the tape 119 near the point at which the tape 119 completes the helical path. A control track signal processor 128 serves to supply pulses simultaneously to the control track heads 126, 127 during recording, and to process the reproduced control track pulses during reproduction. The operation is again similar to that described above.

It is possible to eliminate one or both of the control tracks recorded on the tape. In recording, the signal information is recorded on successive record tracks extending diagonally across the tape in the manner described above. In reproducing the recorded signal information, a first signal pick-up means is positioned in contact with the tape near or at the point at which the tape begins to describe the helical path. The pick-up means acts to produce a pulse at the time of the leading edge of each of the diagonally recorded signal tracks. The resulting pulse train will have a frequency determined by the speed of the head wheel and of the tape upon recording, since a pulse is produced once per signal track and, therefore, once per cycle of the head wheel. The pulse train will correspond substantially to the tone wheel pulse train referred to above.

A second signal pick-up means is spaced from the first pick-up means and positioned in contact with the tape near or at the point at which the tape completes the helical path. The second pick-up means acts to produce a a pulse is produced once per signal track and, therefore, pulse at the time of the leading edge of each of the diagonally recorded signal tracks. A second pulse train is produced having the same frequency as the first pulse train produced by the first pick-up means. If the tension and therefore the effective diameter of the tape in completing the helical path during reproduction is substantially the same as existed during recording, the first and second pulse trains will be substantially of the same phase as well as frequency. Comparing means is provided for detecting a phase error between the pulse trains and producing an error signal according to the phase error. The operation will be similar to that described above. The tension in the tape is controlled in a direction to minimize the error signal.

The system is readily adaptable for use in any signal recording and reproducing system of the type in which the tape describes a helical path past the recording means. A closed loop or open loop system may be used, or one in which the recording means comprises one or more signal recording devices arranged in some manner to scan across the tape at a given helix angle with respect to the direction of tape travel.

It has been mentioned with reference to FIGURE 3 that in recording the dual control tracks the pulses on one edge of the tape 15 are positioned directly across from the pulses recorded on the other edge. It will be assumed that a splice is to be made in the tape 15 requiring the joining of the two segments of the tape 15 between signal tracks 62 and 63, as indicated by the dotted line 130 in FIGURE 3. In completing the splicing operation, the control pulses are made visible by some known technique which typically involves the use of iron filings or similar material. By lining up the pulses on the bottom edge of the tape segment to the left with the pulses on the top edge of the tape segment to the right, a uniform spacing between the signal tracks 62 and 63 is obtained. Since signal tracks 62 and 63 are recorded with the same angle, uniform spacing will result when the control pulses are aligned.

If the signal tracks 62 and 63 are not uniformly spaced following splicing, mistracking by the scanning magnetic head will occur immediately following the splice on play back, since the signal track 63 presents a different angle to the scanning head than does the signal track 62. A period is required for the tape tracks to be re-aligned with the scanning magnetic head resulting in a deterioration of the reproduced signal during this period. This deterioration in the reproduced signal may be avoided by providing uniform spacing between the record tracks following the completion of the splicing operation.

Instead of cutting the tape 15 between recorded signal tracks 62, 63 in the manner described above to complete a splicing operation, a splice can be made in certain applications by cutting directly across the tape 15 at right angles to the tape edge. In describing the embodiment of the invention shown in FIGURE 1, it was pointed out that the tone wheel pulses being of constant frequency can be fed to the control track heads for recording on the dual control tracks. The tone wheel pulses all have the same phase relationship with respect to the position of the scanning magnetic head. Therefore each pulse recorded on one of the dual control tracks bears the same relationship to the diagonally recorded signal tracks as every other pulse recorded on that control track. The position of the scanning head at the time of each pulse recorded on the control tracks is the same.

Where the pulses recorded on the control tracks correspond to the tone wheel pulses, a splice can be completed by cutting across the tape through a pulse recorded on one edge to and through the pulse recorded directly opposite on the other edge of the tape, cutting through a number of the diagonally recorded signal tracks. The second cut of the tape is made by again cutting the tape through a pulse recorded on the one edge to and through the pulse recorded directly across the tape on the other edge. When the ends of the tape segments to be spliced are brought together in an end-to-end relationship, the portions of the diagonally recorded signal tracks at the end of one tape segment will be aligned with the portions of the diagonally recorded signal tracks on the end of the other tape segment. A signal track which starts on one tape segment continues across the splice and is completed on the other tape segment. Each signal track ending at the cut edges of the tape is matched to a continuation of that track on the other side of the splice. The tape when the splice is completed includes signal tracks which extend continuously through the splice from one edge of the tape to the other, permitting the continuous reproduction of the information on the signal tracks by the scanning head.

The completion of a splice in the manner just described is possible due to the fact that each pulse recorded on a control track bears the same relationship to the signal tracks as every other pulse. Therefore when a cut is made through one set of pulse across the tape and a second cut is made through a second set of pulse across the tape, the portions of the signal tracks at the end of the one tape segment should match up with the portions of the signal tracks at the end of the other tape segment. Continuous and uniformly spaced signal tracks result in the area of the splices.

If a television signal is recorded on the signal tracks, a splice can be made by cutting directly across the tape as described with both the horizontal and vertical sync being maintained. In reproducing the recorded television signal, the image recorded on the signal tracks on one side of the splice will be gradually displaced by the image recorded on the tracks on the other side of the splice. In effect, the old image rolls out, while the new image rolls in. Since each signal track includes one television field, the viewer will see a decreasing amount of the image recorded on the signal tracks on one side of the splice and an increasing amount of the image recorded on the signal tracks on the other side of the splice in the direction of tape travel as the scanning head scans succeeding signal tracks extending across the splice. A transition is made in the reproduced television signal from the old image to the new image without introducing a discontinuity in the reproduced signal which is often objectionable to the viewer.

In addition to providing for the control of tape tension in helical scan recording systems, a method and apparatus are provided by which uniform track spacing is obtained in splicing operations, resulting in the continuous, faithful reproduction of a signal recorded on a tape on which splicing operations have been performed.

What is claimed is:

1. A control system for use in a system of the type in which a movable record medium describes a helical path comprising, in combination means for driving said medium through a first helical path, second means for recording a pair of control tracks on said medium during a first passage of said medium through said first helical path, said control tracks having information recorded thereon as to the tension in said medium as it describes said first helical path, said second means being arranged to reproduce said information recorded on said control tracks during a second passage of said medium through a second helical path similar to said first helical path, and means responsive to said reproduced information for controlling the operation of said driving means to cause the tension in said medium during said second passage to be substantially the same as during said first passage of said medium irrespective of the velocity of said medium during said second passage.

2. A control system for use in a system of the type in which a movable record medium describes a helical path, said medium having recorded thereon a pair of control tracks which include information as to the proper tension to be exerted on said medium as it describes said helical path, said control system comprising, in combination, means for driving said medium through said helical path, means for reproducing said information recorded on said control tracks, and means responsive to said reproduced information for controlling the operation of said driving means to cause said proper tension to be exerted on said medium as it describes said helical path irrespective of the velocity of said medium as it describes said helical path.

3. A control system for use in a signal recording and reproducing system of the type in which a movable record medium describes a helical path as it is driven past the signal recording and reproducing device comprising, in combination, means for driving said medium through a first helical path, second and third signal recording and reproducing devices arranged to record in a pair of control tracks on said medium information as to the tension in said medium as it describes said first helical path, said second and third devices being arranged to reproduce said information recorded on said control tracks during a second passage of said medium over a second helical path similar to said first helical path, and means coupled between said second and third devices and said driving means during said second passage and responsive to said reproduced information for controlling the operation of said driving means to cause the tension in said medium during said second passage to be substantially the same as during said first passage of said medium irrespective of said medium's velocity during either said first or second passages.

4. A control system for use in a system of the type in which a movable record medium describes a helical path as it is driven past a signal recording and reproducing device, said medium having recorded thereon a pair of control tracks which include information as to the proper amount of tension to be exerted on said medium as it describes said helical path, said control system comprising, in combination, means for driving said medium over said helical path, second and third signal reproducing devices arranged to reproduce said information recorded on said control tracks, and means responsive to said reproduced information for controlling the operation of said driving means to cause said proper amount of tension to be exerted on said medium as it describes said helical path irrespective of the velocity of said medium as it describes said helical path.

5. A control system for use with a helical scan signal recording and reproducing system, said system including means for driving a magnetic tape over a helical path as said tape passes a magnetic head operated to record a signal on and reproduce said signal from a succession of tracks extending across said tape, said control system comprising, in combination, second and third magnetic heads arranged to record in a pair of control tracks on said tape information as to the tension in said medium as it passes over a first helical path, said second and third magnetic heads being arranged to reproduce said information recorded on said control tracks during a second passage of said tape over a second helical path similar to said first helical path, and means coupled between said second and third magnetic heads and said driving means during said second passage and responsive to said reproduced information for controlling the operation of said driving means to cause the tension in said tape during said second passage to be substantially the same as during said first passage of said tape irrespective of said tape's velocity during either of said first and second passages.

6. A control system for use in a system including means for driving a record medium over a helical path comprising, in combination, a first signal recording and reproducing device positioned in signal transferring relationship with said medium near the point at which said medium begins to describe said helical path, a second signal recording and reproducing device positioned in signal transferring relationship with said medium near the point at which said medium completes said helical path, means to apply a control signal to said devices so that said devices record in a pair of control tracks on said medium information as to the tension in said medium as it describes said helical path, said devices being arranged to reproduce said information recorded on said control tracks during a second passage of said medium over said helical path, and means coupled to said devices during said second passage and responsive to said reproduced information for controlling the operation of said driving means to cause the tension in said medium during said second passage to be substantially the same as during said first passage of said medium over said helical path irrespective of said medium's velocity during either of said first or second passages.

7. A control system for use in a system including means for driving a record medium over a helical path, said record medium having recorded thereon a pair of control tracks which include information as to the proper tension on said medium as it describes said helical path, said control system comprising, in combination, a first signal reproducing device positioned near the point at which said medium begins to describe said helical path for reproducing the information recorded on one of said control tracks, a second signal reproducing device positioned near the point at which said medium completes said helical path for reproducing the information recorded on the other one of said control tracks, and means coupled to said first and second signal reproducing devices and responsive to said reproduced information for controlling the operation of said driving means to cause said proper tension to be exerted on said medium irrespective of the medium's velocity as it describes said helical path.

8. A control system for use in a system including means for driving a record medium over a helical path wherein said control system serves to determine the tension on said medium as it is driven over said helical path comprising, in combination, a first signal recording device positioned in signal transferring relationship with said medium near the point at which said medium begins to describe said helical path, a second signal recording device positioned in signal transferring relationship with said medium near the point at which said medium completes said helical path, and means to apply a pulse train simultaneously to said first and second devices, said first and second devices being spaced from one another and responsive to said pulse train to record a pair of control tracks on said medium with each pulse recorded on said first control track being aligned with a pulse recorded on said second control track so that the alignment of each pair of said aligned pulses on said medium is indicative of the tension on said medium as it passes over said helical path.

9. In a signal recording and reproducing system including means for driving a tape through a helical path as it passes a signal recording and reproducing device, a control system for determining the tension in said tape as it describes said helical path comprising, in combination, a second recording-reproducing device positioned in signal transferring relationship with one edge of said tape near the point at which said tape begins to describe said helical path, a third signal recording-reproducing device positioned in signal transferring relationship with the other edge of said tape near the point at which said tape completes said helical path, means to apply a pulse train of constant frequency simultaneously to said second and third devices during a first passage of said tape over said helical path, said second and third devices being repsonsive to said pulse train to record in a pair of separate control tracks extending along the respective edges of said tape information as to the tension in said tape as it passes over said helical path, means for operating said second and third devices to reproduce said information from said pair of control tracks on said tape during a second passage of said tape over said helical path, and means responsive to said reproduced information for controlling the operation of said driving means to cause the tension in said tape during said second passage to be substantially the same as during said first passage of said tape over said helical path irrespective of said medium's velocity during either of and first and second passages.

10. In a device for recording and reproducing electrical signals which includes a recording-reproducing magnetic head, means moving said head in a circular path about a predetermined axis, means driving a magnetic tape along a path oblique to said axis and in a helical path around the circular path of movement of said head, whereby said head moves diagonally across said tape to scan a succession of parallel tracks on said tape, a control system for determining the tension in said tape as it describes said helical path comprising, in combination, a second magnetic head positioned in contact with said tape near the point at which said tape begins to describe the helical path, a third magnetic head positioned in contact with said tape near the point at which said tape completes said helical path, means to apply a pulse train of constant frequency simultaneously to said second and third heads during a first passage of said tape over a first helical path to cause said second and third heads to record in a pair of control tracks extending along said tape information as to the tension in said tape as it describes said first helical path, said second and third heads being arranged to reproduce the information recorded on said control tracks during a second passage of said tape over a second helical path, and means responsive to said reproduced information for controlling the operation of said tape driving means to provide substantially the same tension in said tape during said second passage as during said first passage of said tape irrespective of said medium's velocity during either of said first and second passages.

11. In a signal recording and reproducing system including means for moving a record medium through a helical path as it passes a signal recording-reproducing device, a control system for determining the tension in said medium as it passes over said helical path comprising, in combination, a second signal recording-reproducing device in contact with one edge of said medium near the point at which said medium begins to describe the helical path, a third signal recording-reproducing device in contact with the other edge of said medium near the point at which said medium completes said helical path, means to apply a pulse train of constant frequency simultaneously to said second and third devices during a first passage of said medium over a first helical path to cause said second device to record said pulse train on a first control track extending along said one edge of said medium, said third device being spaced from said second device an amount to cause said third device to record said pulse train on a second control track along said other edge of said tape with a separate pulse being recorded on said second control track directly across said tape from each pulse recorded on said first control track, said second and third devices being arranged to reproduce the pulse trains recorded on said first and second control tracks during a second passage of said medium over a second helical path, means responsive to said reproduced pulse trains to produce an error signal according to the phase difference therebetween, and means responsive to said error signal for controlling the operation of said medium moving means to cause substantially the same tension in said medium during said second passage as during said first passage of said medium irrespective of said medium's velocity during said second passage.

12. In a device for producing electrical signals including a magnetic head, means moving said head in a circular path about a predetermined axis, means moving a magnetic tape along a path oblique to said axis and in a helical path around the circular path of movement of said head, whereby said head scans a succession of tracks extending diagonally across said tape, said tape having a pulse train of constant frequency recorded on a first control track extending along one edge thereof and a second pulse train of said constant frequency recorded on a second control track extending along the other edge thereof with each pulse in said second pulse train being recorded directly across said tape from a pulse in said first pulse train, a control system for maintaining the tension in said tape according to the pulse trains recorded on said first and second control tracks comprising, in combination, a second magnetic head positioned in contact with said one edge of said tape near the point at which said tape begins to describe said helical path for reproducing the pulse train recorded on said first control track, a third magnetic head positioned in contact with said other edge of said tape near the point at which said tape completes said helical path for reproducing the pulse train recorded on said second control track, means for comparing the pulse trains reproduced from said first and second control tracks to produce an error signal according to the phase difference therebetween, and means responsive to said error signal for controlling the operation of said tape moving means to alter the tension in said tape as it describes said helical path in a direction to minimize said error signal, irrespective of the velocity of said tape as it describes said helical path.

13. In a device for recording electrical signals including a magnetic head, means moving said head in a circular path about a predetermined axis, means moving a magnetic tape along a path oblique to said axis and in a helical path around the circular path of movement of said head, whereby said head scans a succession of tracks extending diagonally across the tape, a system for recording dual control tracks on said tape comprising, in combination, a second magnetic head positioned in contact with one edge of said tape near the point at which said tape begins to describe said helical path, a third magnetic head positioned in contact with the other edge of said tape near the point at which said tape completes said helical path, means to apply a pulse train of constant frequency simultaneously to said second and third devices to cause said second head to record said pulse train on a first control track extending along said one edge of said tape, said third head being spaced from said second head and responsive to said pulse train to record said pulse train on a second control track extending along said other edge of said tape with each pulse being recorded on said second control track directly across said tape from a pulse recorded on said first control track.

14. In a device for recording and reproducing electrical signals including a magnetic head, means moving said head in a circular path about a predetermined axis, means moving a magnetic tape along a path oblique to said axis and in a helical path around the circular path of movement of said head, whereby said head scans a succession of tracks extending diagonally across the tape, a control system for determining tape tension comprising, in combination, a second magnetic head positioned in contact with one edge of said tape near the point at which said tape begins to describe a helical path, a third magnetic head positioned in contact with the other edge of said tape near the point at which said tape leaves said helical path, means to apply a pulse train of constant frequencv simultaneously to said second and third heads during a first passage of said tape over a first helical path to cause said second head to record said pulse train on a first control track extending along said one edge of said tape, said third head being spaced from said second head and responsive to said pulse train to record said pulse train on a second control track extending along said other edge of said tape with each pulse being recorded on said second control track directly across from a pulse recorded on said first control track, said second and third heads being arranged to reproduce the respective pulse trains recorded on said first and second control tracks during a second passage of said tape over a second helical path similar to said first helical path, a phase comparing means responsive to said reproduced pulse trains for producing an error signal according to a phase error therebetween, and means responsive to said error signal for controlling the operation of said tape moving means to vary the tension in said tape during said second passage over said second helical path in a direction to minimize said error signal irrespective of said tape's velocity during said second passage.

15. In an arrangement for recording and reproducing electrical signals including a signal recording-reproducing device, means moving said device in a circular path about a predetermined axis, means moving a record medium along a path oblique to said axis and in a helical path around the circular path of movement of said device, whereby said device scans along a succession of record tracks extending diagonally across said medium, a control system for determining the effective diameter of said medium as it describes said helical path comprising, means for recording on said medium information as to the effective diameter of said medium during a first passage of said medium over said helical path and for reproducing said information from said medium during a second passage of said medium over said helical path so as to maintain the effective diameter of said medium substantially the same during said second passage as during said first passage of said medium irrespective of said medium's velocity during said second passage.

16. In an arrangement for recording and reproducing an electrical signal on a magnetic tape including a pair of cylinders disposed in spaced apart, end-to-end relation, said cylinders being coaxial and of substantially the same diameter, a rotary member mounted for rotation on the common axis of said cylinders in the space between said cylinders, motor means for rotating said member at a constant speed, a magnetic head mounted on the periphery of said member in a position to extend into the space between the adjacent ends of said cylinders and contact said tape when wrapped around said mandrel, and means for moving said tape in a helical path about said mandrel, whereby said head scans along a succession of parallel tracks, extending diagonally across said tape, a control system for determining tape tension as said tape describes said helical path comprising, in combination, a second magnetic head positioned in contact with one edge of said tape near the point at which said tape begins to describe said helical path, a third magnetic head positioned in contact with the other edge of said tape near the point at which said tape leaves said helical path, means to apply a pulse train of constant frequency simultaneously to said second and third heads during a first passage of said tape over a first helical path to cause said second head to record said pulse train on a first control track extending along said one edge of said tape, said third head being spaced from said second head and responsive to said pulse train to record said pulse train on a second control track extending along said other edge of said tape with each pulse recorded on said second track being aligned with a pulse recorded on said first track, said second and third heads being arranged to reproduce said pulse trains recorded on said respective control tracks during a second passage of said tape over a second helical path, means responsive to said reproduced pulse trains for producing an error signal determined by the phase difference therebetween, and means responsive to said error signal for controlling the operation of said tape moving means to cause the tension in said tape during said second passage to be substantially the same as during said first passage of said tape irrespective of said tape's velocity during said first and second passages.

17. In an arrangement for recording and reproducing an electrical signal as claimed in claim 16, a tone wheel and pick-up means operated by said motor means to produce a pulse train having a frequency determined by the rotational speed of said member, said pulse train applying means being coupled between said pick-up means and said second and third heads for applying the pulse train produced by said tone wheel and pick-up means simultaneously to said second and third heads during said first passage of said tape over said first helical path.

18. In an arrangement for recording and reproducing electrical signals including a signal recording-reproducing device, means moving said device in a circular path about a predetermined axis, means moving a record medium along a path oblique to said axis and in a helical path around the circular path of movement of said device, whereby said device scans along a succession of record tracks extending diagonally across said medium, said arrangement comprising, means including said device for recording electrical signals on said medium during a first passage of said medium over a first helical path, and means responsive to said recorded electrical signals during a second passage of said medium over a second helical path similar to said first helical path so as to maintain the effective diameter of said medium substantially the same during said second passage as during said first passage of said medium irrespective of the medium's velocity over said second passage.

19. A control system for use in a system including means for driving a record medium having information recorded thereon over a helical path, said control system comprising, in combination, a first signal pick-up device positioned near the point at which said medium begins to describe said helical path for producing a first control signal from said recorded information, a second signal pick-up device positioned near the point at which said medium completes said helical path for producing a second control signal from said recorded information, said first and second control signals being of the same frequency but differing in phase according to change in the tension on said medium as it describes said helical path, and means responsive to said control signals for controlling the operation of said driving means according to the phase error between said control signals so that a controlled tension is exerted on said medium irrespective of said medium's velocity as it describes said helical path.

20. In a device for reproducing electrical signals including a magnetic head, means moving said head in a circular path about a predetermined axis, means moving a magnetic tape having said electrical signals recorded thereon along a path oblique to said axis and in a helical path around the circular path of movement of said head, whereby said head scans a succession of tracks extending diagonally across said tape, a control system for maintaining the tension in said tape as it describes said helical path comprising, in combination, a first signal pick-up means positioned in contact with one edge of said tape near the point at which said tape begins to describe said helical path for producing a first pulse train from said recorded electrical signals, a second signal pick-up means positioned in contact with the other edge of said tape near the point at which said tape completes said helical path for producing a second pulse train from said recorded electrical signals, said first and second pulse trains being of the same frequency but differing in phase according to change in the tension on said tape as it describes said helical path, means for comparing said first and second pulse trains to produce an error signal according to the phase difference therebetween, and means responsive to said error signal for controlling the operation of said tape moving means to alter the tension in said tape as it describes said helical path, irrespective of tape's velocity, in a direction to minimize said error signal.

References Cited

UNITED STATES PATENTS

| | | | |
|---|---|---|---|
| 2,751,439 | 6/1956 | Bourton | 340—174.1 |
| 3,050,105 | 8/1962 | Dolby | 156—379 |
| 3,059,049 | 10/1962 | Johnson | 179—100.2 |
| 3,230,307 | 1/1966 | Bounsall | 179—100.2 |
| 3,283,085 | 11/1966 | Lemke | 179—100.2 |

BERNARD KONICK, *Primary Examiner.*

V. P. CANNEY, *Assistant Examiner.*

UNITED STATES PATENT OFFICE
CERTIFICATE OF CORRECTION

Patent No. 3,378,646 April 16, 1968

Fred E. Shashoua et al.

It is certified that error appears in the above identified patent and that said Letters Patent are hereby corrected as shown below:

Column 1, line 26, "on" should read -- an --; line 50, "produced" should read -- reproduced --. Column 11, line 24, cancel "a pulse is produced once per signal track and, therefore,". Column 20, line 44, after "of" insert -- said --.

Signed and sealed this 2nd day of December 1969.

(SEAL)
Attest:

Edward M. Fletcher, Jr.
Attesting Officer

WILLIAM E. SCHUYLER, JR.
Commissioner of Patents